Inventor
J. Nield
by Marks & Clerk
Attys

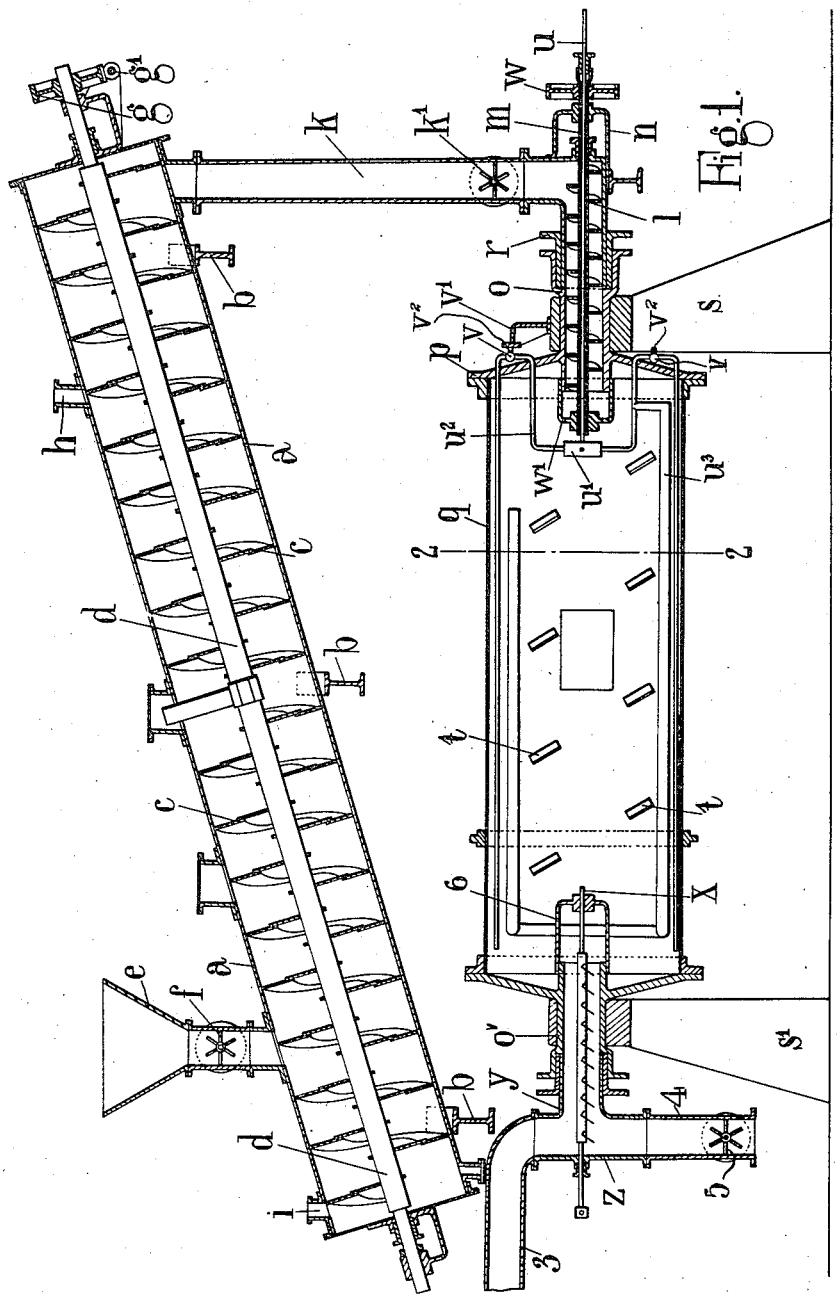

Patented July 8, 1924.

1,500,957

UNITED STATES PATENT OFFICE.

JOSEPH NIELD, OF SALISBURY, SOUTH RHODESIA, SOUTH AFRICA.

APPARATUS FOR EXTRACTING OIL, FATS, AND WAXES, AND FOR CONDITIONING MAIZE AND OTHER GRAIN.

Application filed May 1, 1924. Serial No. 710,464.

*To all whom it may concern:*

Be it known that I, JOSEPH NIELD, a British subject, and residing at Salisbury, in the Territory of South Rhodesia, South Africa, have invented a certain new and useful apparatus for Extracting Oil, Fats, and Waxes and for Conditioning Maize and Other Grain, of which the following is a specification.

This invention relates to apparatus for extracting oil, fats and waxes and for conditioning maize and other grain.

More particularly, it concerns a treatment for the continuous extraction of oil, fats and waxes by a solvent, and for the recovery of the solvent, the same treatment being also applicable for use in the conditioning of maize and other grain.

Referring now to the accompanying drawings which represent by way of example one form of construction according to the present invention:

Figure 1 is a general sectional elevation of the whole apparatus.

In carrying the invention into effect, $a$ is an inclined cylinder carried upon suitable girder supports $b$. Arranged longitudinally within the cylinder $a$ is a worm conveyor $c$ carried by a central longitudinal shaft $d$, which may for the purposes of the present invention assume the form of a steam pipe to heat the contents of the cylinder.

Mounted upon the cylinder towards the lower end is a hopper $e$ into which are fed the fatty or oleaginous materials that are to be treated, or the maize or other grain which is to be conditioned. The hopper $e$ is preferably fitted with a mechanical feeder $f$ as shown. The shaft $d$ at its upper end after passing through the usual packing gland in the cover plate of the casing $a$, is fitted with a worm wheel $g$ which is driven by a worm $g^1$, but any other suitable drive may be used. The conveyor is so rotated as to cause the material fed to it by the hopper $e$ to travel up the cylinder, so that it moves in counter-current to a suitable solvent for dissolving the fatty material which solvent is admitted to the cylinder at $h$. The solvent which becomes richer and richer as it flows along down the cylinder, is finally discharged therefrom at the outlet $i$, at the lowermost end of the cylinder, whence it passes away to a still or other separator.

When the material under treatment has reached the upper end of the cylinder $a$, it is discharged into a down-take $k$ on its way to a steamer in which the solvent is recovered. The down-take $k$ by means of a mechanical feeder $k^1$ delivers the material to a conveyor $l$ mounted on a hollow horizontal shaft $m$. One part of the worm rotates within a stationary casing $n$ which is fast with the down-take $k$, while the other part of the worm operates within a casing $o$ which forms a hollow trunnion attached to the centre of an end cover plate $p$ of an horizontal drum $q$ which forms a steamer for recovering the solvent. The axial casing $o$ which rotates and the casing $n$ which is stationary fit one into the other and are separated by a packing gland $r$. The material accumulates within the down-take $k$ and forms a seal to prevent any backflow of vapour into the cylinder $a$.

Figure 2:
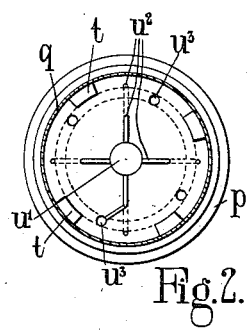
Figure 2 is a transverse section taken on the line 2—2 of Figure 1.

The trunnion-like casing $o$ is supported by a fixed bearing $s$ and a similar trunnion support $o^1$ is provided at the other end of the steamer $q$ which is supported by a corresponding bearing $s^1$. The steamer $q$ is a hollow cylindrical chamber that carries on its internal surface a series of helical ribs or strakes $t$ for the purpose of keeping the material in movement through the chamber which is delivered thereinto by the worm conveyor $l$. In order that the chamber $q$ may be kept in a heated condition, there is arranged within the hollow shaft $m$ a steam pipe $u$ which extends into the steamer and into a distributing box $u^1$ from which steam pipe branches $u^2$ are led which extend through the whole length of the chamber. Four such branches are preferably used as shown in Figure 2 and each branch is preferably left with an open end. In order that the passage of steam passing through the branches may be controlled, each branch includes a valve $v$ which is adapted to be intermittently opened and closed by suitable means such, for instance, as a cam plate $v^1$ so arranged on the fixed bearing s as to engage and actuate the stems $v^2$ of the valves $v$ during rotation of the steamer drum $q$.

The arrangement for rotating the chamber $q$ comprises a driving pulley $w$ carried on the outer end of the hollow shaft $m$, said hollow shaft serving to drive the worm conveyor $l$ and being suitably connected through a spider frame $w^1$ to the end cover plate of the chamber.

It will be understood that the cylinder and the steam pipe branches $u^2$ and the valves $v$ all rotate together and each valve is so constructed that as it passes the cam $v^1$ it is momentarily opened to pass a charge of steam; thus the material mixed with the solvent within the chamber $q$ is kept in a heated condition and is fed progressively forward through the chamber where at its other end it is discharged. To further heat the chamber $q$ an extra steam branch $u^3$ forms preferably a closed circuit within the chamber as shown, which serves primarily for heating the chamber, while the branches $u^2$ serve not only for heating the chamber but also for maintaining in the interior of the chamber a humid atmosphere.

As the material under treatment reaches the other end of the steamer it is withdrawn therefrom through the hollow trunnion $o^1$ by means of a drag conveyor carried upon a shaft $x$. The shaft $x$ is arranged longitudinally within not only the hollow trunnion $o^1$ but within an extension $y$ from a double-armed branch discharge $z$. One arm 3 of such discharge serves for carrying off the vaporized solvent while the other branch 4 carries away the spent material under the control of a mechanical discharger 5. The shaft $x$ is supported at one end by a spider frame 6 while the other end passes through a packing gland in the wall of the double-armed discharge $z$ and any suitable means may be employed to constantly reciprocate the shaft $x$ backwards and forwards.

Figure 3:
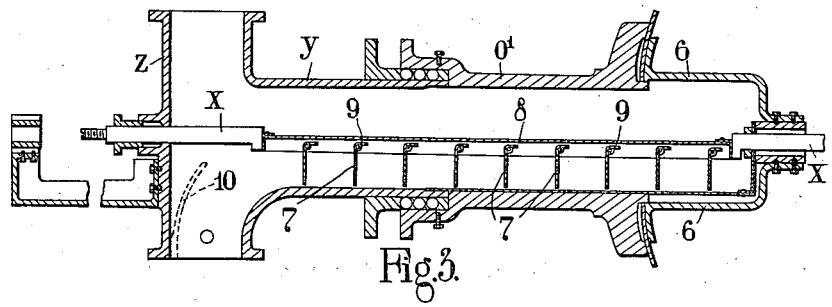
Figure 3 is detail of Figure 1 drawn to an enlarged scale.
Figure 4:
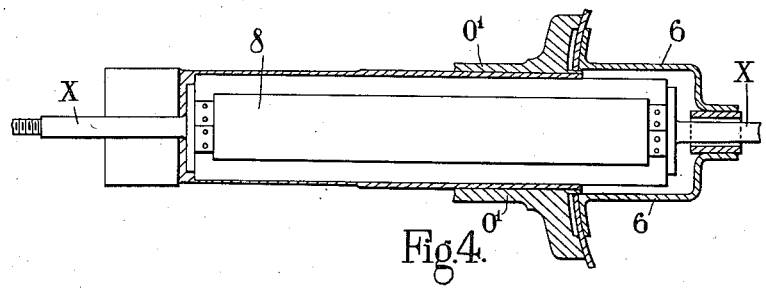
Figure 4 is a plan view of Figure 3.
Figure 5:
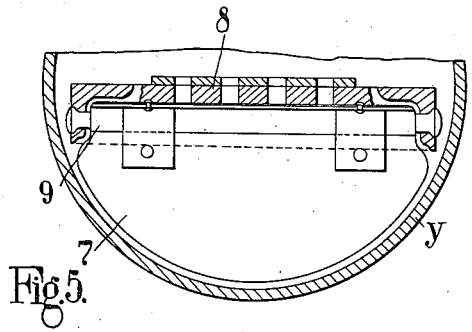
Figure 5 is an end view of the lower half of Figure 4 drawn on an enlarged scale.

As shown more clearly in Figures 3 to 5, the drag conveyor comprises a series of hinged flaps 7 which depend from the under surface of a plate 8 which forms an intermediate portion extending between two shaft portions $x$ or which may be hung from a single shaft $x$, the hinged flaps being so arranged that when the rod is pushed to the right the flaps yield, as shown in Figure 1, so as to pass over the material which may at the moment be within the hollow trunnion $o^1$. On the return stroke, however, the flaps are prevented from yielding by their short bent ends 9 and are thus enabled to drag the material forward over a distance equal to the length of the stroke. The spent material thus gradually passes through the trunnion $o^1$ and when it reaches the branch 4 it will be discharged thereinto, this being assisted by a guide plate 10 that may be used which will prevent any accumulation against the end wall of the connection $z$ that might result in a temporary jamming of the conveyor. The upper part of the trunnion is free so as to permit of the escape of the vaporized solvent which is finally allowed to escape at 3 to any suitable container or condenser from whence it may be used over again. The mechanical discharge 5 is driven at such a speed as will maintain an accumulation of spent material above it that will act as a seal to prevent any solvent vapour escaping in this direction.

From the foregoing it will be understood that the plant comprises apparatus whereby oils and fats may be continuously extracted from the material under treatment and at the same time the material is afterwards subjected to a steam treatment so that the solvent may be separated therefrom and recovered, this also being in continual operation.

When it is desired to employ this apparatus for the conditioning of maize and other grain, the maize is fed in by means of a hopper $e$ to meet a current of warm water which is fed into the cylinder $a$ at $h$; after the grain has thus been steeped it passes through the downtake and into the steamer for further conditioning treatment and is finally discharged. If desired, however, such steaming treatment may be omitted.

Having now described my invention, what I claim as new and desire to secure by Letters Patent is:—

1. An apparatus for the continuous extraction of oils, fats, waxes and the like from materials containing the same and the simultaneous recovery of solvent from the treated material, comprising an inclined extraction cylinder, means for feeding material to be treated thereto, a screw conveyor having a hollow shaft within said cylinder for conveying material upwardly through the cylinder, means permitting the introduction of solvent at the upper end of said cylinder whereby the solvent is caused to travel in a counter-current to and in contact with the material under treatment, a rotary heated solvent recovery cylinder in communication with the extraction cylinder, said recovery cylinder having a hollow trunnion at each end, means for feeding the material into one end of said cylinder through one of the hollow trunnions as well as affording access for a heating medium thereto, discharging means at the other end of said cylinder in the other trunnion and means for separately discharging spent material and solvent therefrom.

2. An apparatus for the continuous extraction of oils, fats, waxes and the like from materials containing the same and the simultaneous recovery of solvent from the treated material, comprising an inclined extraction cylinder, means for feeding material to be treated thereto, a screw conveyor having a hollow shaft within said cylinder for conveying material upwardly through the cylinder, means permitting the introduction of solvent at the upper end of said cylinder whereby the solvent is caused to travel in a counter-current to and in contact with the material under treatment, a rotary heated solvent recovery cylinder in communciation with the extraction cylinder, said recovery cylinder having a hollow trunnion at each end, means for feeding the material into one end of said cylinder through one of the hollow trunnions as well as affording access for a heating medium thereto, a drag conveyor in the trunnion at the other end of the said cylinder and means for separately discharging spent material and solvent therefrom.

3. An apparatus for the continuous extraction of oils, fats, waxes and the like from materials containing the same and the simultaneous recovery of solvent from the treated material, comprising an inclined extraction cylinder, means for feeding material to be treated thereto, a screw conveyor having a hollow shaft within said cylinder for conveying material upwardly through the cylinder, means permitting the introduction of solvent at the upper end of said cylinder whereby the solvent is caused to travel in a counter-current to and in contact with the material under treatment, a rotary heated solvent recovery cylinder in communication with the extraction cylinder, sealing means interposed between the extraction cylinder and the solvent recovery cylinder, said recovery cylinder having a hollow trunnion at each end, means for feeding the material into one end of said cylinder through one of the hollow trunnions as well as affording access for a heating medium thereto, a drag conveyor in the trunnion at the other end for drawing material from said cylinder providing a free passage for the recovered solvent, means for discharging solvent and means for discharging spent materials from the recovery cylinder, the latter means constituting a seal whereby escape of solvent is prevented at the discharge opening for the spent material, and a guide plate interposed between the drag conveyor and said seal.

In testimony whereof I have signed my name to this specification.

JOSEPH NIELD.